US005506671A

United States Patent [19]
Buts et al.

[11] Patent Number: 5,506,671
[45] Date of Patent: Apr. 9, 1996

[54] ELECTROSTATOGRAPHIC PRINTING INCLUDING THE USE OF COLOURLESS TONER

[75] Inventors: Alfons J. Buts, Mortsel; Etienne M. De Cock; Lucien A. De Schampelaere, both of Edegem, all of Belgium

[73] Assignee: Xeikon NV, Mortsel, Belgium

[21] Appl. No.: 257,114

[22] Filed: Jun. 8, 1994

[30] Foreign Application Priority Data

Jun. 18, 1993 [EP] European Pat. Off. ............. 93304765

[51] Int. Cl.⁶ .......................... G03G 15/01; G03G 13/08
[52] U.S. Cl. ...................... 355/326 R; 430/45; 430/97; 355/282
[58] Field of Search .................................. 355/280, 282, 355/326 R, 327, 245; 430/42, 45, 97, 110

[56] References Cited

U.S. PATENT DOCUMENTS

| | | | |
|---|---|---|---|
| 4,286,031 | 8/1981 | Kuehnle et al. | 355/327 X |
| 4,307,168 | 12/1981 | Lelental et al. | 430/110 X |
| 5,147,745 | 9/1992 | Russel | 430/42 X |
| 5,260,753 | 11/1993 | Haneda et al. | 355/326 R X |
| 5,339,146 | 8/1994 | Aslam et al. | 355/282 X |

FOREIGN PATENT DOCUMENTS 0081887   6/1983   European Pat. Off. .
0106690   4/1984   European Pat. Off. .
0324192   7/1989   European Pat. Off. .

OTHER PUBLICATIONS

Patents Abstracts of Japan, vol. 7027, Feb. 3, 1983 (E156), JPA 57–181265.
Patent Abstracts of Japan, vol. 16340, Jul. 23, 1992 (E1238), JPA 4–101566.
Patent Abstracts of Japan, vol. 17239, May 13, 1993 (P1534), JPA 4–362960.
Patent Abstracts of Japan, vol. 17242, May 14, 1993 (P1535), JPA 4–365061.

*Primary Examiner*—Joan H. Pendegrass
*Attorney, Agent, or Firm*—Brumbaugh, Graves, Donohue & Raymond

[57] ABSTRACT

An electrostatographic printing process forms one or more colorless toner images in combination with at least one color toner image produced in an electrostatographic way on a receptor element. The information for producing an electrostatic latent image corresponding with the colorless toner image derives from a digital electrical signal representing (i) the spatial boundaries of the colorless toner image and (ii) the amount of deposited colorless toner per pixel. The receptor element is conveyed past a number of toner-image producing electrostatographic stations. At each image-producing station an electrostatic latent image is formed on a rotatable endless surface; toner is deposited on the electrostatic latent image to form a toner image on the rotatable surface, and the toner image is transferred from its corresponding rotatable surface onto the receptor element.

19 Claims, 11 Drawing Sheets

ELECTROSTATOGRAPHIC PRINTING INCLUDING THE USE OF COLOURLESS TONER

BACKGROUND OF THE INVENTION

1. Field of the Invention

The present invention relates to an electrostatographic printing process for forming one or more colourless toner images in combination with at least one colour toner image and to an electrostatographic printer for carrying out said process.

2. Description of the Related Art

Electrostatographic printing operates according to the principles and embodiments of non-impact printing as described e.g. in "Principles of Non-impact Printing" by Jerome L. Johnson (1986)—Palatino Press—Irvine, Calif., 92715 U.S.A.

Electrostatographic printing includes electrographic printing in which an electrostatic charge is deposited image-wise on a dielectric recording member as well as electrophotographic printing in which an overall electrostatically charged photoconductive dielectric recording member is image-wise exposed to conductivity increasing radiation producing thereby a "direct" or "reversal" toner-developable charge pattern on said recording member. Magnetic brush development is suited for "direct" as well as "reversal" development. "Direct" development is a positive-positive development, and is suited for producing pictures and text.

"Reversal" development is a "positive-negative" o vice versa development process and is of particular interest when the exposure derives from an image in digital electrical form, wherein the electrical signals modulate a laser beam or the light output of light-emitting diodes (LEDs). It is advantageous with respect to a reduced load of the electrical signal modulated light source (laser or LEDs) to record graphic information (e.g. printed text) in such a way that the light information corresponds with the graphic characters so that by "reversal" development in the exposed area of a photoconductive recording layer, toner can be deposited to produce a positive reproduction of the electronically stored original. In high speed electrostatographic printing the exposure derives practically always from electronically stored, e.g. computer stored, information.

As used herein, the term "electrostatographic" also includes the direct image-wise application of electrostatic charges on an insulating support, for example by ionography.

In the electrophotographic art multi-colour printers are of two types. In multiple-pass single-station printers, image receiving material is passed repeatedly through a single image-producing station, each pass being used to print a different colour separation image. In single-pass multiple-station printers, image receiving material is passed once successively through a number of image-producing stations, each such station serving to print a different colour separation image. Multi-colour printers are known that produce a plurality of colour toner images on a photoconductive member, drum or endless belt, wherefrom the toner images are transferred directly onto printing stock material such as a paper sheet or paper web material, the latter after toner image formation being cut into the desired printing frames. In an alternative way toner images are subsequently transferred first to an insulating belt from distinct image-forming stations and are then transferred together to a receiving sheet or web.

Development of latent electrostatic images may proceed with various kind of toner broadly divided into two types: wet or dry type (ref. e.g. IEEE Transactions on Electronic Devices, Vol. ED-19, No. 4, April 1972 "Xerographic Development Processes: A Review" by Thomas L. Thourson, p. 495–511).

In dry development the application of dry toner powder to the substrate carrying the latent electrostatic image may be carried out by different methods known as, "cascade", "magnetic brush", "powder cloud", "impression" or "transfer" development also known as "touchdown" development described e.g. in said IEEE Transactions on Electronic Devices, Vol. ED-19, No. 4, April 1972, pp.495–511.

It is often desirable to provide at least some parts of the image with different optical characteristics. Thus, for example, it may be desired that graphic images, i.e. pictures, exhibit a glossy appearance, whereas normally it is preferred that printed text has a more matte finish, making it easier to read. When the printing stock, e.g. resin sheet material or resin-coated paper, has a high gloss it may be desirable to coat selected parts of the printing stock surface with a material having a matte finish before or after depositing colour toner thereon. It is further advantageous, when using certain printing stock, e.g. very smooth highly calendered paper, that has poor adherence to selected colour toners to pre-coat the surface of that printing material with colourless toner improving the adhesion (fixing) in the areas that have to receive the colour toners.

Furthermore, it may be desired to coat the coloured toner images with a layer that gives protection against degradation by mechanical contact (abrasion) and/or radiation such as ultraviolet radiation that may attack the colouring matter in the toner and give rise to colour-fading or discolouration.

So, all these measures follow the desire to apply in discretionary way colourless toner in direct contact with the printing stock surface and/or as overcoat on (an) already formed colour toner image(s) at some stage in the colour image formation.

It is known from published European patent application EP-A-0486235 (Konica Corporation) to adhere uniformly a transparent colourless toner layer onto a recording material carrying already (a) coloured toner image(s) and fixing said transparent toner layer together with the colour toner image(s) on the recording material. According to that technique the toner is applied non-image-wise which means in large quantity and follows the relief pattern of the already formed colour toner images. By said technique it is the intention to produce high glossiness over the whole surface of the toner receptor material.

It is further known from European patent specification EP-A-0081887 (Coulter Stork Patents B.V.) to form a protective transparent coating on a coloured toner image by depositing a transparent protective toner electrophotographically and in registration on said coloured toner image. For that purpose a multi-colour original from which the multi-colour reproduction is to be made is split up in different light-transmitting colour separation images. Such a method is limited to the application of the coating in only those parts corresponding with one or more of the separation images used in the exposure of the photoconductive recording member.

SUMMARY OF THE INVENTION

It is an object of the present invention to provide an electrostatographic printing process for forming one or more colourless toner images in combination with at least one colour toner image to define thereof the visual aspect, e.g. to enhance gloss over picture parts, to improve legibility of text parts, to improve optical stability, whiteness and/or abrasion resistance, and/or to level off the relief pattern presented by superimposed toner-image parts.

It is a further object of the present invention to provide by said process an improved adherence of (a) colour toner image(s) to the printing stock by using a pre-deposited colourless toner as adherence improving agent.

It is another object of the present invention to provide an electrostatographic printing apparatus by means of which the above goals can be achieved.

In accordance with a first aspect of the present invention there is provided an electrostatographic printing process for forming one or more colourless toner images in combination with at least one colour toner image produced in an electrostatographic way on a receptor element, whereon the toner images are fixed, wherein the information for producing at least one electrostatic latent image corresponding with said colourless toner image(s) derives from a digital electrical signal representing (i) the spatial boundaries of said colourless toner image and (ii) the amount of deposited colourless toner per pixel, and wherein said process comprises the step of conveying said receptor element past a plurality of toner image-producing electrostatographic stations, wherein at each image-producing station the following operations are carried out: forming each electrostatic latent image on a rotatable endless surface means; depositing toner on said electrostatic latent image to form a toner image on said rotatable surface means; and transferring each toner image from its corresponding rotatable surface means onto said receptor element.

According to a second aspect of the present invention, there is provided a printing apparatus for forming one or more colourless toner images in combination with at least one colour toner image on a receptor element, whereon the toner images are fixed, wherein said apparatus comprises means for producing at least one electrostatic latent image corresponding with said colourless toner image(s) which means operates with a digital electrical signal representing (i) the spatial boundaries of said colourless toner image(s) and (ii) the amount of deposited colourless toner per pixel, and wherein said apparatus comprises means for conveying said receptor element past a plurality of toner image-producing electrostatographic stations, and in each image-producing station there are: means for forming an electrostatic latent image on a rotatable endless surface means; means for depositing toner on said electrostatic latent image to form a toner image on said rotatable surface means; and means for transferring each toner image from its corresponding rotatable surface means onto said receptor element.

By "pixel" is meant in the present invention an elementary picture element, as is well known in the art. The digital electrical signal may stem from an analog signal, obtained e.g. from an electro-optical scanning device, and transformed by analog-to-digital (A/D) converter into a digital format. Preferably, the information for producing at least one electrostatic latent image corresponding with said colourless toner image(s) derives from a separate set of electrical signals from the information for producing the latent image(s) corresponding with the coloured toner image(s).

By speaking of a "colourless" toner in the present invention such does not mean that the optical density of said toner in the three main colours (red, green and blue) is zero. "Colourless" includes according to the present invention "slightly coloured" up to a degree wherein the deposited and fixed "colourless" toner deposit is characterized by being substantially transparent uniformly over the visible spectrum (400 to 700 nm). The colourless toner is thus substantially transparent.

By the fact that the colourless toner is substantially transparent, the inherent colour of the applied colour toners is not materially masked and the lightness of the colours is maintained. Lightness describes the relative amount of reflected light from the image.

By a "colour toner" is meant any toner reflecting or absorbing red, green and blue light in equal or different degree to produce a visually detectable white, black or "monochrome" image. So, a colour toner in the scope of the present invention may contain white or black colouring matter or colorants which absorb (subtract) light from certain parts of the visible spectrum.

Dry toners are preferred since electrophoretic wet toner developers because of the flammability of the normally used hydrocarbon carrier liquids pose safety and ecological problems. Dry toner may be a one-component toner or a two component toner.

Single component developers operate solely with toner particles in that carrier particles are absent for triboelectric charging.

In two component toners the toner particles are mixed with carrier particles providing a definite triboelectric charge polarity to the toner particles. For magnetic brush development magnetizable carrier particles are required. Magnetic brush development provides sufficient solid area reproduction without substantial fringe effect because the magnetic brush of conductive magnetized carrier particles having toner particles electrostatically adhering thereto acts itself as developing electrode.

Dry-development toners essentially comprise a thermoplastic binder consisting of a thermoplastic resin or mixture of resins including colouring matter, e.g. carbon black or colouring material such as finely dispersed dye pigments or soluble dyes.

The triboelectric chargeability of the toner particles is defined by the binder resin and said colorant substances and that chargeability may be modified or enhanced with a charge controlling agent as described e.g. in U.S. Pat. No. 5,169,738.

In response to the electric field of the latent image, the toner transfers from the carrier beads to the recording material containing an electrostatic charge pattern.

In positive-positive image-reproduction, also called "direct development" the toner deposits onto the areas having a charge sign opposite to the charge sign of the toner particles.

In "reversal development" the toner is deposited in the light-discharged area of a photoconductive layer (ref. e.g. "Electrophotography" by R. M. Schaffert—The Focal Press—London, New York, enlarged and revised edition 1975, pp. 50–51). During reversal development a driving development voltage is applied between the development station or biasing electrode and the image-wise exposed photoconductive layer.

The mean diameter of dry toner particles for use in magnetic brush development is about 10 μm (ref. "Principles of Non Impact Printing" by Jerome L. Johnson—Palatino Press Irvine Calif., 92715 U.S.A. (1986), p. 64–85), but may be from 1 to 5 μm for high resolution development (see e.g.

British patent specification GB-A-2180948 and (International patent specification WO-A-91/00548).

For magnetic brush development the toner particles are mixed with carrier particles on the basis of ferromagnetic material e.g. steel, nickel, iron beads, ferrites and the like or mixtures thereof. The ferromagnetic particles may be coated with a resinous envelope or are present in a resin binder mass as described e.g. in U.S. Pat. No. 4,600,675. The average particle size of the carrier particles is preferably in the range of 20 to 200 μm and more preferably in the range of 50 to 200 μm. The carrier particles possess sufficient density and inertia to avoid adherence to the electrostatic charge images during the development process. The carrier particles can be mixed with the toner particles in various ratios, best results being obtained when about 1 part by weight of toner is mixed with about 10 to 100 parts of carrier. The shape of the carrier particles, their surface coating and their density determines their flow properties.

Easily flowing carrier particles with spherical shape are prepared according to a process described in British patent specification GB 1174571.

For producing visible images the toner particles contain in the resinous binder a colorant (dissolved dye or dispersed pigment) which may be white or black or has a colour of the visible spectrum, not excluding however the presence of infra-red or ultra-violet absorbing substances and substances that produce black in admixture.

White toner images may be used on coloured printing stock or transparent (resinous) receptor material e.g. for the production of back-lightened transparent advertising panels.

The colourless developer applied in the process of the present invention may contain the same mixture as the colour toners, save for the dyes or pigments.

Transparent heat-fixable toner layers require the use of transparent thermoplastic resins such as polyester, polyethylene, polystyrene and copolymers thereof, e.g. styrene-acrylic resin, styrene-butadiene resin, acrylate and methacrylate resins, polyvinyl chloride resin, vinyl acetate resin, copoly(vinyl chloride-vinyl acetate) resin, copoly(vinyl chloride-vinyl acetate-maleic acid) resin, vinyl butyral resins, polyvinyl alcohol resins, polyurethane resins, polyimide resins, polyamide resins and polyester resins. Polyester resins are preferred for providing high gloss and improved abrasion resistance.

The gloss of a fixed toner image can be expressed as a reflectance value R determined at measuring angle 60° according to DIN standard No. 67 530 (November 1972).

Preferably applied polyester resins providing improved abrasion resistance and high gloss are linear polycondensation products of (i) difunctional organic acids, e.g. maleic acid, fumaric acid, terephthalic acid and isophthalic acid and (ii) difunctional alcohols such as ethylene glycol, triethylene glycol, an aromatic dihydroxy compound, preferably a bisphenol such as 2,2 -bis(4-hydroxyphenyl)-propane called "bisphenol A" or an alkoxylated bisphenol, e.g. propoxylated bisphenol examples of which are given in U.S. Pat. No. 4,331,755. For the preparation of suitable polyester resins reference is made to GB-P 1,373,220.

As described in EP 0 324 192 gloss of transparent gelatin layers is improved by the use of colloidal silica having an average particle size of between 10 and 100 nm. Said silica has the same gloss improving effect in transparent toner layers.

A matte finish may be obtained by applying a colourless toner including minor amounts of matting agents which may be white pigments such as colloidal $TiO_2$ particles applied in a coverage that maintains the translucent character of the colourless toner.

Protection against ultraviolet radiation may be obtained by incorporation in the colourless toner of known UV-absorbing compounds that themselves are preferably practically colourless. Examples of suitable UV-absorbing compounds are 2,4-dihydroxybenzophenone (melting point: 140° C.) which is a known stabilizer for polyvinyl chloride resins and polyesters, and 2-hydroxy- 4-methoxybenzophenone (melting point 60° C.) which is an other known stabilizer for resins and dyes sold under the tradename UVINUL. Further are mentioned UV absorbing compounds of the benzotriazole type as described e.g. in European patent specification EP-A-0106690.

Improved whiteness of the final substrate (e.g. paper printing stock) can be obtained by incorporating in the colourless toner known optical brightening agents such as 4,4'-bis(4,6-disubst.-1,3,5-triazin-2-yl)stilbenes, bis(benzoxazol-2-yl) derivatives and certain coumarins as described e.g. in the book "Fluorescent Whitening Agents" by R. Anliker et al. (1975) Georg Thieme Publishers Stuttgart.

In a convenient preparation of colourless toner as defined herein the toner resin(s) is (are) heated to form a melt including the selected ingredients such as whitening agent, UV absorbing agent, gloss improving agent or matting agent and kneaded to obtain a homogeneous mixture with said ingredients which are dispersed in said resin(s) or dissolved therein forming a solid solution. In colour toners a colorant being in the form of one or more soluble dyes or coloured pigments is incorporated.

After cooling the solidified mass is crushed and ground by e.g. jet mill. The ground toner is classified e.g. by air sifter to separate the toner particles of desired particle size, e.g. in the diameter range of 3 to 15 μm.

In black-and-white copying the colorant is usually an inorganic pigment which is preferably carbon black, but is likewise e.g. black iron (III) oxide. Inorganic coloured pigments are e.g. copper (II) oxide and chromium (III) oxide powder, milori blue, ultramarine cobalt blue and barium permanganate.

Examples of carbon black are lamp black, channel black and furnace black e.g. SPEZIALSCHWARZ IV (trade name of Degussa Frankfurt/M—Germany) and VULCAN XC 72 and CABOT REGAL 400 (trade names of Cabot Corp. High Street 125, Boston, U.S.A.).

Toners for the production of colour images may contain organic dyes or pigments of the group of phthalocyanine dyes, quinacridone dyes, triaryl methane dyes, sulphur dyes, acridine dyes, azo dyes and fluoresceine dyes. A review of these dyes can be found in "Organic Chemistry" by Paul Karrer, Elsevier Publishing Company, Inc. New York, U.S.A (1950).

Likewise may be used the dyestuffs described in the following European patent specifications EP-A-0384040, 0393252, 0400706, 0384990, and 0394563.

The electrostatically deposited toner particles may be fixed to their final substrate with known heat-fixing or heat-and-pressure fixing means. For obtaining optimal fixing results, e.g. by radiant heat, their melt viscosity may be controlled by the kind of resin binder and material dispersed or dissolved therein and/or flowing agents that may be added as fillers.

Thus, it is preferred that the images are fixed to the receptor element either after the transfer of the last toner image, or before the transfer of the last toner image to said receptor element.

It is possible for the same resin material to be used for all developers in the printer, or alternatively different resins can be employed at different image-producing stations, e.g. a colourless toner pre-coating station may contain a colourless toner wherein the applied resin in molten state has a better adherence (wetting power) to the final substrate than the colour toner(s) applied subsequently.

In an electrostatographic printing apparatus according to the present invention the rotatable endless surface means is usually a belt or drum, preferably a belt or drum which has a photoconductive surface. In the following general description, reference is made to a drum, but it is to be understood that such references are also applicable to endless belts or to any other form of endless surface means.

Each toner image-producing electrostatographic station preferably comprises means for charging the surface of the drum, and usually the surface of the drums at all the image-producing stations are charged to the same polarity. Using photo-conductors of the organic type, it is most convenient to charge the surface of the drums to a negative polarity and to develop the latent image formed thereon in reversal mode by the use of a negatively charged toner.

It is convenient for each image-producing station to comprise a driven rotatable magnetic developer brush and a driven rotatable cleaning brush, both in frictional contact with the drum surface, said brushes rotating in opposite directions.

Preferably, the image-producing station where colourless toner is deposited is the first and/or last in succession of said image-producing stations. The printer construction according to the invention is particularly advantageous where the printer is a multi-colour printer comprising magenta, cyan, yellow and black image-producing stations, followed by the colourless toner image-producing station as a last station applying a protective, transparent gloss controlling coating of colourless heat-fixable toner. Thus, the colourless toner image is superimposed on the colour toner images or a selected part thereof. This is important when the colourless toner is applied in order to render a particular surface effect, which effect might not be achieved if the colourless toner image were not the last image to be applied. However, it is within the scope of this invention to apply the colourless toner at an earlier stage in the process if the effect achieved thereby is desired.

According to an embodiment the colourless toner is deposited uniformly over the whole image frame of (a) coloured toner image(s). By the use of mechanically strong resins in the colourless toner composition, particularly high abrasion resistance will be provided to the colour images and the substrate, e.g. paper, whereon the toner images are fixed.

According to another more economic embodiment with regard to the use of toner, the colourless toner image(s) is (are) formed in substantial congruency with one or more of said colour toner images.

Thus, after said receptor element has been covered with at least one colour toner image the corresponding areas thereof are coated with colourless toner transferred onto said receptor element from said rotatable endless surface means.

Preferably, the latent image formed at the image-producing station where colourless toner is deposited, is formed at a resolution coarser than the resolution of the latent images formed at an image-producing station where a colour toner image is deposited. Thus, the means for forming an electrostatic latent image at that image-producing station at which colourless toner is deposited, is preferably capable of forming said latent image at a resolution coarser than the resolution at which latent images can be formed at said other image-producing stations. This means that minor registration displacements for the colourless toner image will not be important once the colour toner images are sufficiently covered.

According to a further embodiment the areas of the receptor element (printing stock) that will be covered subsequently with said colour toner image(s) are coated first with colourless toner transferred e.g. onto said receptor element from a rotatable endless surface means.

According to a special embodiment the amount of deposited colourless toner per pixel is such that the total amount of toner deposited per pixel is substantially uniform.

An electrostatographic printer for use according to the present invention comprises an image fixing station preferably downstream of all the image-producing stations, although intermediate fixing between image-producing stations is also possible. Preferably the image fixing station is of the radiant heat type. By the heat supplied therewith the resin(s) in the various developers carried on the receptor element melt and remain fixed thereto on re-solidification.

In one embodiment of a preferred electrostatographic printer, the web is a final support for the toner images and is unwound from a roll, fixing means being provided in succession to the last image-producing station for fixing the transferred images on the web. In this embodiment, the printer may further comprise a roll stand for unwinding a roll of web to be printed in the printer, and a web cutter for cutting the printed web into sheets.

The drive means for the web may comprise one or more drive rollers, preferably at least one drive roller being positioned downstream of the image-producing stations and a brake, optionally at least one drive roller being positioned upstream of the image forming stations. The speed of the web through the printer and the tension therein is dependent upon the torque applied to these drive rollers.

Preferably the web is conveyed through the printer at a speed of from 5 cm/sec to 50 cm/sec and the tension in the web at each image-producing station preferably lies within the range of 0.2 to 2.0N/cm web width.

In an alternative printer embodiment, the web is a temporary support in the form of a tensioned endless belt, and the printer further comprises transfer means for transferring the images formed on the belt onto a final support, fixing means being provided for fixing the transferred images on the final support. In this embodiment, the final support may be in web or sheet form.

For transferring the toner we prefer, as transfer means, a corona discharge device which sprays charged particles having a charge opposite to that of the toner particles. The supply current fed to the corona discharge device is preferably within the range of 1 to 10 µA/cm web width, most preferably from 2 to 5 µA/cm web width, depending upon the paper characteristics and will be positioned at a distance of from 3 mm to 10 mm from the path of the web.

It is possible for the image-producing stations to be arranged in two sub-groups, one sub-group forming an image on one web side and the other sub-group forming an image on the other web side, thereby to enable duplex printing.

BRIEF DESCRIPTION OF THE DRAWINGS

The invention will now be further described, purely by way of example, by reference to the accompanying drawings in which:

FIG. 8 shows in detail one embodiment of the control circuit for controlling the registration of images in a printer according to the invention, the figure being shown in two parts:

DESCRIPTION OF THE PREFERRED EMBODIMENTS

In the description which follows, the formation of images by the "reversal" development mode is described. One skilled in the art will appreciate however, that the same principles can be applied to "direct" development mode image formation.

Figure 1:
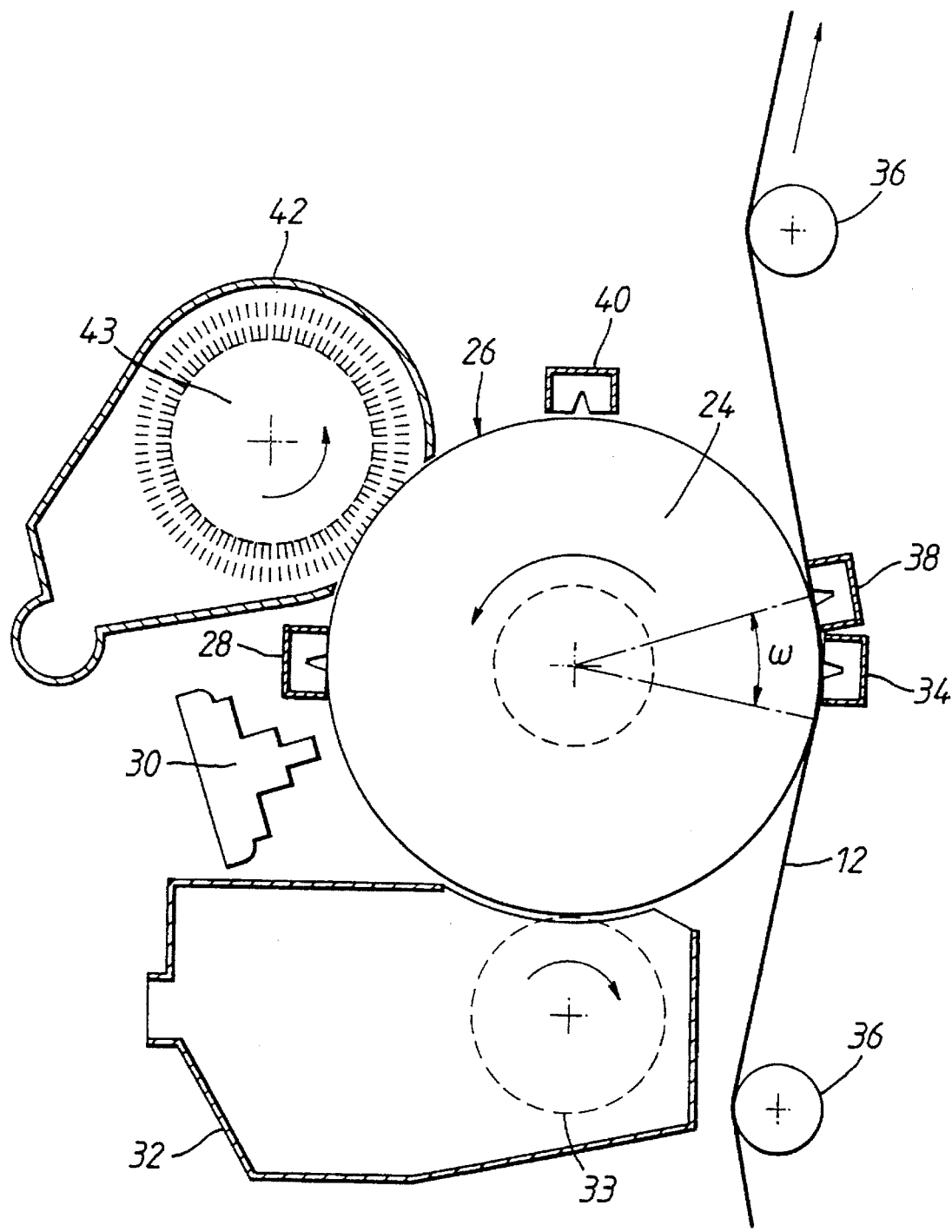
FIG. 1 shows in detail a cross-section of one of the print stations of the printers shown in FIGS. 2, 3 and 4.

As shown in FIG. 1, each printing station comprises a cylindrical drum 24 having a photoconductive outer surface 26. Circumferentially arranged around the drum 24 there is a main corotron or scorotron charging device 28 capable of uniformly charging the drum surface 26, for example to a potential of −600 V, an exposure station 30 which may, for example, be in the form of a scanning laser beam or an LED array, which will image-wise and line-wise expose the photoconductive drum surface 26 causing the charge on the latter to be selectively dissipated, for example to a potential of about −250 V, leaving an image-wise distribution of electric charge to remain on the drum surface 26. This so-called "latent image" is rendered visible in reversal development mode by a developing station 32 which includes an electrically biased magnetic brush 33 which as known in the art will bring toner particles in contact with the drum surface 26.

In the developing station 32 the developer drum 33 which is adjustably mounted, enabling it to be moved radially towards or away from the drum 24.

Figure 2:
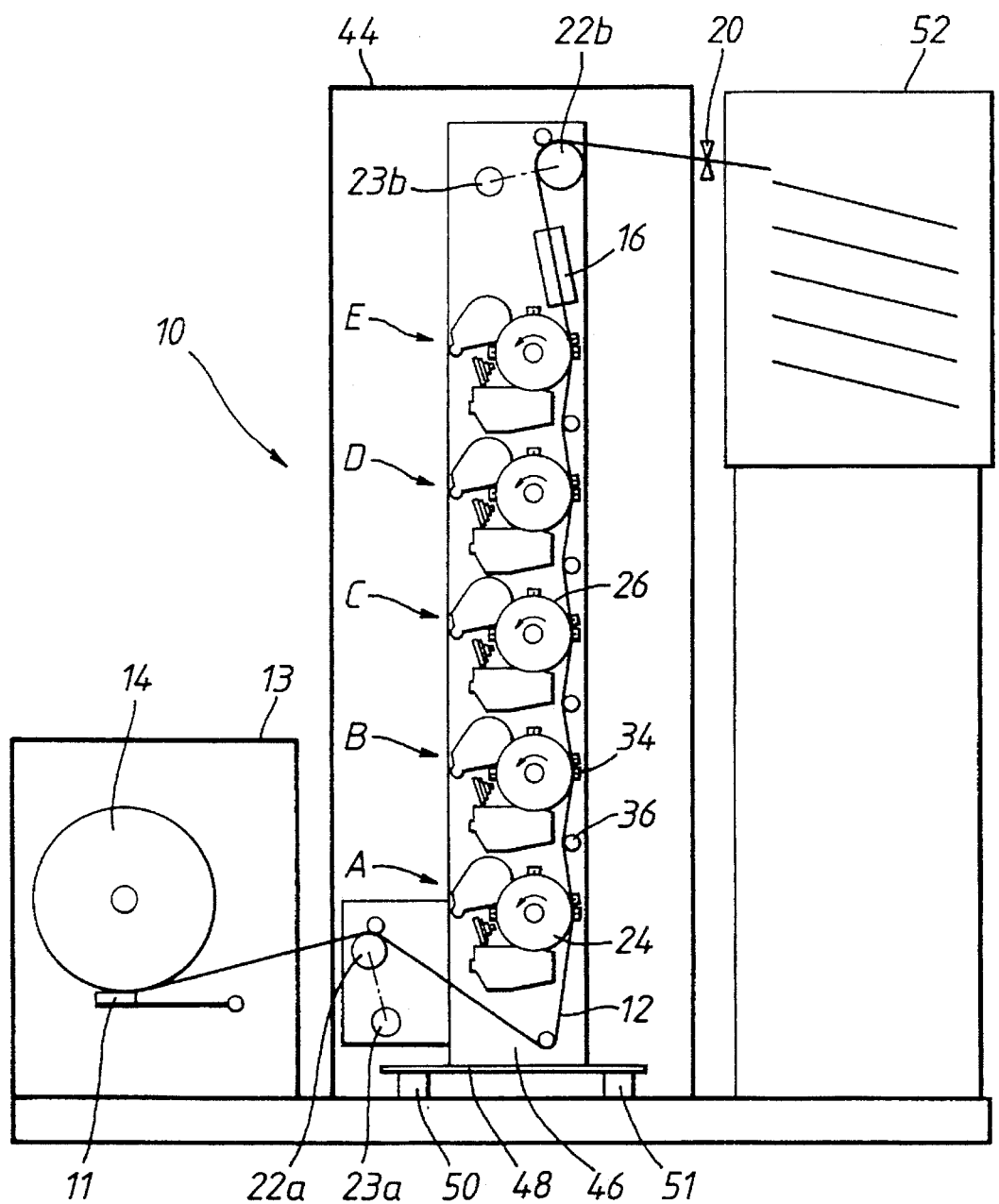
FIG. 2 shows an electrostatographic single-pass multiple station printer suitable for use according to the invention in an embodiment of simplex printing.

The printer 10 in FIG. 2 comprises 4 printing stations, A, B, C and D which are arranged to print yellow, magenta, cyan and black images respectively. The printing stations A, B, C and D are arranged in a substantially vertical configuration, although it is of course possible to arrange the stations in a horizontal or other configuration. The printer has a supply station 13 in which a roll 14 of web material 12 is housed in sufficient quantity to print, say, up to 5,000 images. The web 12 is conveyed into a tower-like printer housing 44 in which a support column 46 is provided, housing four similar printing stations A to D. In addition, a further station E is provided in order to print a desired colourless toner image. The printing stations A to E are mounted in a substantially vertical configuration resulting in a reduced footprint of the printer and additionally making servicing easier. The column 46 may be mounted against vibrations by means of a platform 48 resting on springs 50, 51.

After leaving the final printing station E, the image on the web is fixed by means of the image-fixing station 16 and fed to a cutting station 20 (schematically represented) and a stacker 52 if desired.

The web 12 is conveyed through the printer by two drive rollers 22a, 22b one positioned between the supply station 13 and the first printing station A and the second positioned between the image-fixing station 16 and the cutting station 20. The drive rollers 22a, 22b are driven by controllable motors, 23a, 23b. One of the motors 23a, 23b is speed controlled at such a rotational speed as to convey the web through the printer at the required speed, which may for example be about 125 mm/sec. The other motor is torque controlled in such a way as to generate a web tension of, for example, about 1N/cm web width.

The moving web 12 is in face-to-face contact with the drum surface 26 over a wrapping angle of about 15° determined by the position of guide rollers 36.

According to one embodiment, the developer contains (i) toner particles containing a mixture of a polyester resin, a pigment of the appropriate colour (the pigment being absent in the case of image-producing station E) and normally a charge-controlling compound giving triboelectric charge to the toner, and (ii) carrier particles charging the toner particles by frictional contact therewith. The carrier particles may be made of a magnetic material, such as iron or iron oxide. The developing unit 32 includes a brush-like developer drum 33 which rotates in the same direction as the drum 24. In a typical construction of a developer station, the developer drum 33 contains magnets carried within a rotating sleeve causing the mixture of toner and magnetisable material to rotate therewith, to contact the surface 26 of the drum 24 in a brush-like manner. Negatively charged toner particles are charged to a charge level of, for example 9 μC/g V and are attracted to the photo-exposed areas on the drum surface 26 by the electric field between those areas and the negatively electrically biased developer so that the latent image becomes visible.

After development, the toner image adhering to the drum surface 26 is transferred to the moving web 12 by a transfer corona device 34. The transfer corona device, being on the opposite side of the web to the drum, and having a high potential opposite in sign to that of the charge on the toner particles, attracts the toner particles away from the drum surface 26 and onto the surface of the web 12. The transfer corona device typically has its corona wire positioned about 7 mm from the housing which surrounds it and 7 mm from the paper web. A typical transfer corona current is about 3 μA/cm web width. The transfer corona device 34 also serves to generate a strong adherent force between the web 12 and the drum surface 26, causing the latter to be rotated in synchronism with the movement of the web 12 and urging the toner particles into firm contact with the surface of the web 12. The web, however, should not tend to wrap around the drum beyond the point dictated by the positioning of a guide roller 36 and there is therefore provided circumferentially beyond the transfer corona device 34 a web discharge corona device 38 driven by alternating current and serving to discharge the web 12 and thereby allow the web to become released from the drum surface 26. The web discharge corona device 38 also serves to eliminate sparking as the web leaves the surface 26 of the drum.

Thereafter, the drum surface 26 is pre-charged to a level of, for example −580 V, by a pre-charging corotron or scorotron device 40. The pre-charging corona device 40 makes the final charging by the corona 28 easier. Any residual toner which might still cling to the surface of the drum is collected at a cleaning unit 42 known in the art. The cleaning unit 42 includes a rotatable cleaning brush 43 which is driven to rotate in a direction opposite to that of the drum 24 and at a peripheral speed of, for example twice the peripheral speed of the drum surface. The position of the cleaning brush 43 can be adjusted towards or away from the drum surface 26 to ensure optimum cleaning. The cleaning brush is earthed or subject to such a potential with respect to the drum as to attract the residual toner particles away from the drum surface. After cleaning, the drum surface is ready for another recording cycle.

After passing the first printing station A, as described above, the web passes successively to printing stations B, C and E, where other images are transferred to the web. It is critical that the images produced in successive colour toner stations be in register with each other. In order to achieve this, the start of the imaging process at each station has to be critically timed. Registration of the colourless toner images with the colour toner images may be obtained as for the colour toner images.

Figure 3:
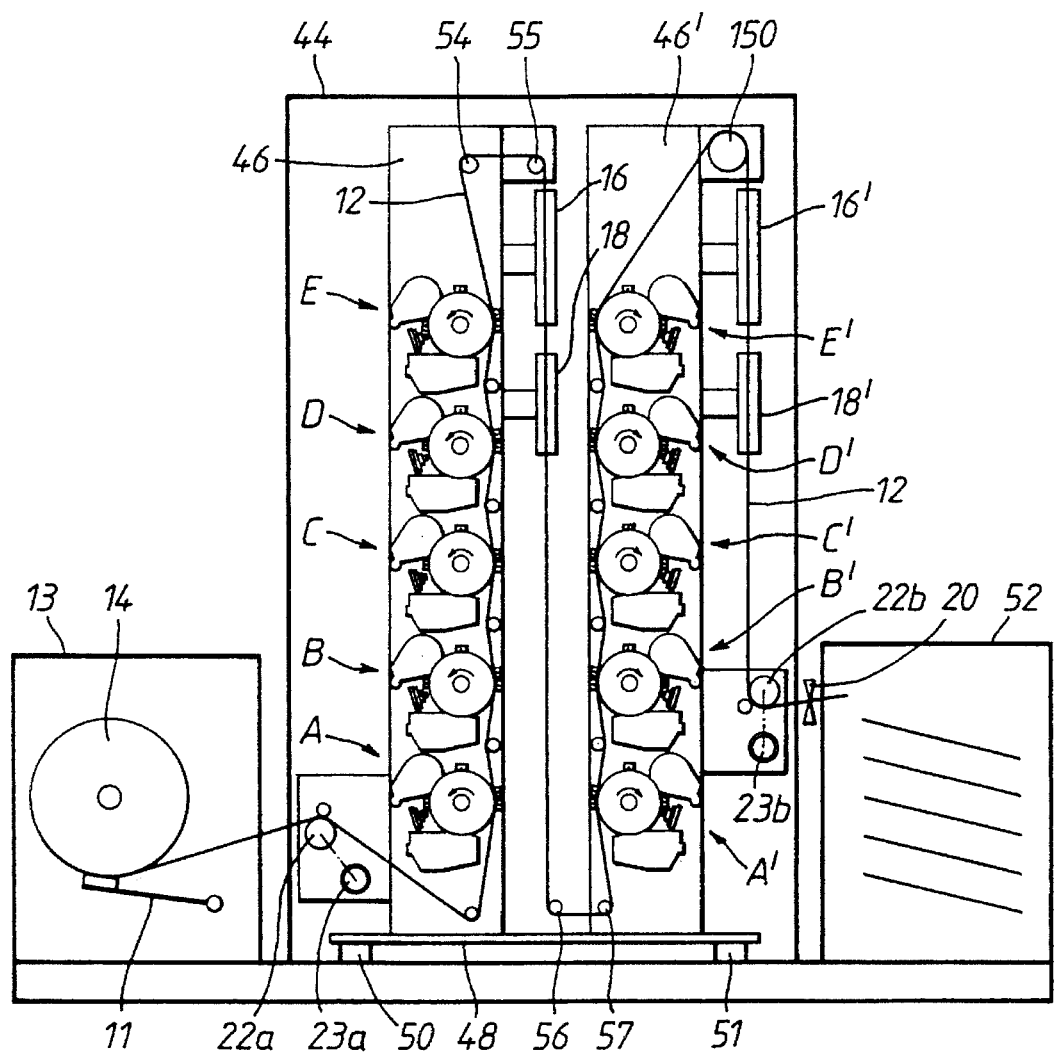
FIG. 3 shows a section of a printer according to an alternative embodiment suitable for sequential duplex printing.

In FIG. 3 there is shown a duplex printer which differs from the printer shown in FIG. 2 in that there are two support columns 46 and 46', housing printing stations A to E, and A' to E' respectively.

After leaving the colourless toner printing station E the web passes over upper direction-reversing rollers 54, 55 before entering the first image-fixing station 16. Towards the bottom of the printer the web 12, with a fixed image on one face, passes over lower direction-reversing rollers 56, 57 to enter the second column 46' from the bottom. The web 12 then passes the printing stations A' to E' where a second image is printed on the opposite side of the web. The second image is fixed by the image-fixing station 16'. In the particular embodiment shown in FIG. 4, all components of the printing stations are identical and this gives both operating and servicing advantages.

Figure 4:
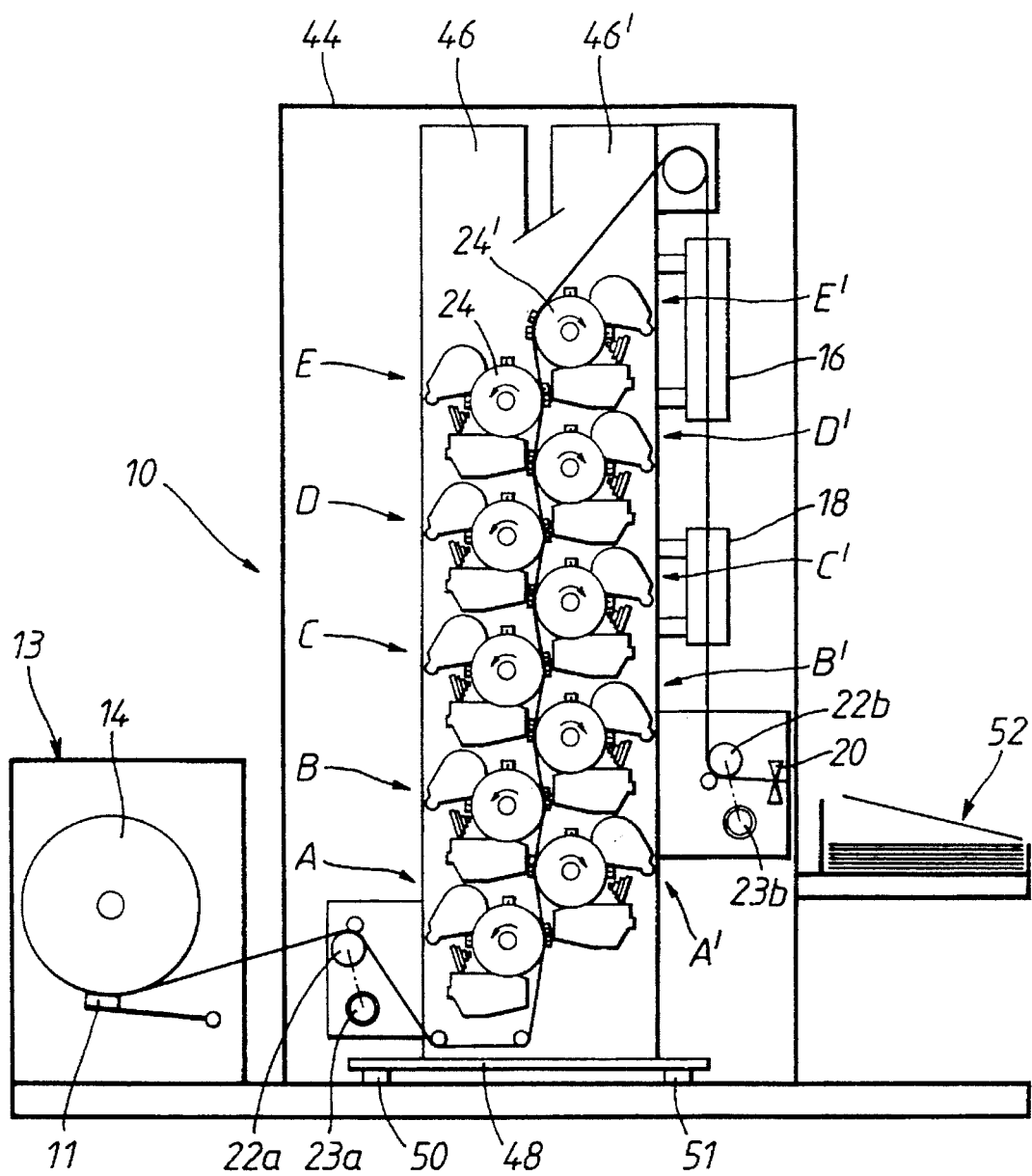
FIG. 4 shows a section of a printer according to a further alternative embodiment suitable for simultaneous duplex printing.

FIG. 4 shows a more compact version of the duplex printer shown in FIG. 3. As in the case of FIG. 3, two columns 46 and 46' are provided each housing printing stations A to E and A' to E' respectively. For the sake of clarity, the columns 46 and 46' are not fully shown in FIG. 4. In contra-distinction to FIG. 3, the columns 46 and 46' are mounted closely together so that the web 12 travels in a generally vertical path defined by the facing surfaces of the imaging station drums 24, 24'. This arrangement is such that each imaging station drum acts as the guide roller for each adjacent drum by defining the wrapping angle. In the particular embodiment of FIG. 4, there is no need for an intermediate image-fixing station. The arrangement is more compact than the embodiment of FIG. 3. The paper web path through the printer is shorter and this gives advantages in reducing the amount of paper web which is wasted when starting up the printer. By avoiding the use of intermediate fixing paper web distortion and mis-registering is avoided.

Figure 5:
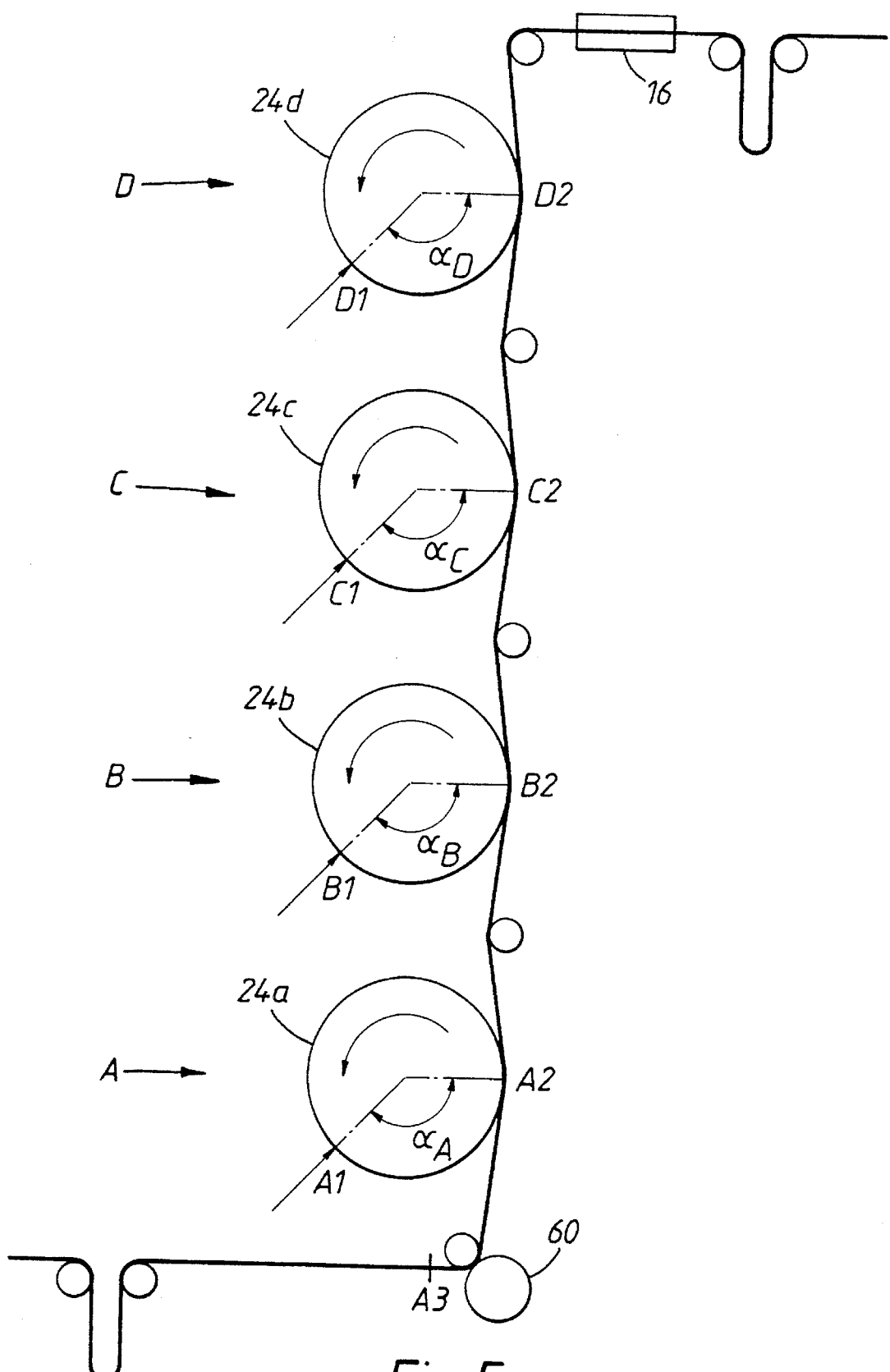
FIG. 5 shows a schematic representation of transferring images in register.

With reference to FIG. 5, and for the purposes of describing the operation of the register control means, we define:

writing points $A_1$, $B_1$, $C_1$ and $D_1$ being the position of the writing stations of the image printing stations A, B, C and D as projected, perpendicular to the drum surface, on the drum surface;

transfer points $A_2$, $B_2$, $C_2$ and $D_2$ being the points on the surface of drums $24a$, $24b$, $24c$ and $24d$ that coincide with the centre of the wrapping angle $\omega$ (See FIG. 2);

lengths $l_{A2B2}$, $l_{B2C2}$ and $l_{C2D2}$ being the lengths measured along the web between the points $A_2$ and $B_2$, $B_2$ and $C_2$ and $C_2$ and $D_2$;

lengths $l_{A1A2}$, $l_{B1B2}$, $l_{C1C2}$ and $l_{D1D2}$ being the lengths measured along the surface of the drums $24a$, $24b$, $24c$ and $24d$ between the points $A_1$ and $A_2$, $B_1$ and $B_2$, $C_1$ and $C_2$ and $D_1$ and $D_2$.

In order to obtain good registration, the delay between writing an image at $A_1$ and writing a related image at $B_1$, $C_1$ or $D_1$ should be equal to the time required for the web to move over a length $l_{AB}$, $l_{AC}$ or $l_{AD}$, wherein:

$$l_{AB} = l_{A1A2} + l_{A2B2} - l_{B1B2} \text{ and consequently}$$

$$l_{AC} = l_{A1A2} + l_{A2B2} + l_{B2C2} - l_{C1C2} \text{ and}$$

$$l_{AD} = l_{A1A2} + l_{A2B2} + l_{B2C2} + l_{C2D2} - l_{D1D2}$$

In practice the lengths $l_{A1A2}$ etc., and $l_{A2B2}$ etc. will usually be designed to be nominally identical but, due to manufacturing tolerances, minor differences may not be avoided and for the purposes of explaining the principles of registration they are assumed not to be identical. From the above equations, one derives easily a possible cause of mis-registration, ie that when using a fixed time $$t_{AB} = l_{AB}/V_{average}$$

with which the imaging at point $B_1$ is delayed from the imaging at point $A_1$, while the web speed v shows variations over this period of time, the web will have travelled over a length $$l_{AB}' = \int^{t_{AB}} v dt.$$

Since it is most likely that $l'_{AB}$ does not equal $l_{AB}$, the image written at point $B_1$ will, when being transferred onto the web, not coincide with the image written at point $A_1$, thus causing mis-registration.

Let $f_E$ be the pulse frequency being generated by the encoder means 60 wherein $f_E$ equals $n.f_D$; the line frequency $f_D$ being the frequency at which lines are printed ($f_D = v/d$) where d is the line distance and n is a whole number.

Each encoder pulse is indicative of unit web displacement ($\rho = d/n$). The relative position of the web at any time is therefore indicated by the number of pulses z generated by the encoder.

Given that the relative distance l equals the distance over which the web has moved during a given period of time, then:

$$z = l/\rho$$

and, in accordance with the definitions of $l_{AB}$, $l_{AC}$ and $l_{AD}$ above, we can define:

$$Z_{AB} = Z_{A1A2} + Z_{A2B2} - Z_{B1B2}$$

$$Z_{AC} = \ldots \text{ ect.}$$

Thus, by delaying the writing of an image at point B1 by a number of encoder pulses $z_{AB}$ from the writing of an image at $A_1$, it is assured that both images will coincide when being transferred onto the web. This is so irrespective of any variation in linear speed of the paper web, provided that the drums 24a to 24d rotate in synchronism with the displacement of the paper web, as described above.

While the encoder 60 is shown in FIG. 5 as being mounted on a separate roller in advance of the printing stations A to D, we prefer to mount the encoder on one of the drums 24a to 24d, preferably on a central one of these drums. Thus, the web path between the drum carrying the encoder and the drum most remote therefrom is minimised thereby reducing any inaccuracies which may arise from unexpected stretching of the paper web 12, and of variations of $l_{A2B2}$ etc. due to eccentricity of the drums or the rollers defining the wrapping angle κ.

A typical optical encoding device would comprise 650 equally-spaced marks on the periphery of a drum having a diameter of 140 mm in the field of vision of a static optical detection device. With a line distance of about 40 μm, this would generate 1 pulse per 16 lines.

Figure 6:
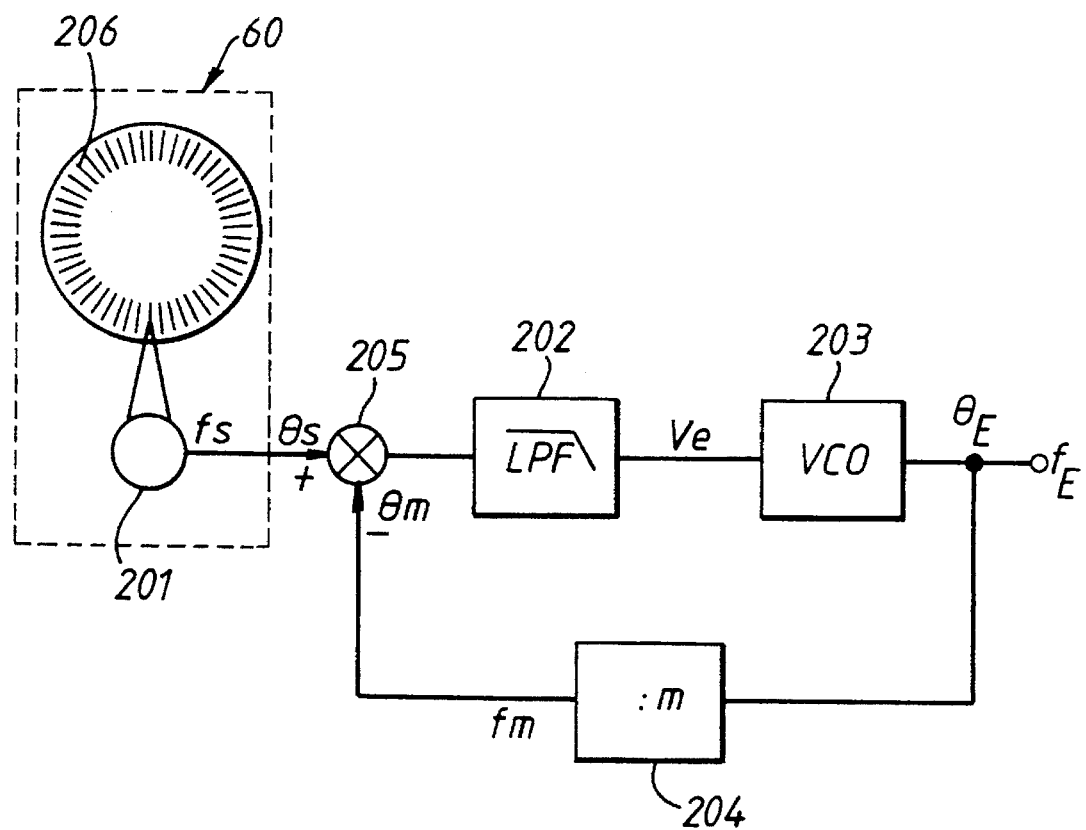
FIG. 6 shows a frequency multiplier circuit for use in a printer according to the invention.

Referring to FIG. 6, there is shown an encoder 60 comprising an encoder disc 206 together with a frequency multiplier circuit. The frequency multiplier circuit, having very good phase tracking performance, multiplies the input encoder sensor frequency $f_s$ by a constant and integer number m. To obtain good register resolution, m is chosen high enough that $$f_E = mf_s = nf_D$$

thus $$f_s = nf_D/m.$$

It is necessary that $f_s$ is much less than $f_D$ and it therefore follows that m must be much higher than n.

A voltage controlled oscillator 203 generates a square waveform with a frequency $f_E$. This frequency is divided by m in the divider 204 to a frequency $f_m$, from which $\Theta_m$ is compared in phase comparator 205 with the phase $\Theta_s$ of the incoming frequency $f_s$ coming from the encoder sensor 201.

A low pass filter 202 filters the phase difference $\Theta_s - \Theta_m$ to a DC voltage $V_e$ which is fed to the voltage controlled oscillator 203.

edges. Every phase edge of $f_E$ represents a web displacement of d/n.

The low pass filter 202 cancels out the high frequency variations in the encoder signal, which are normally not related to web speed variations but to disturbances caused by vibrations.

The time constant of the low pass filter 202 defines the frequency response of the multiplier so as to realise a cut-off frequency of, for example 10 Hz.

Figure 7:
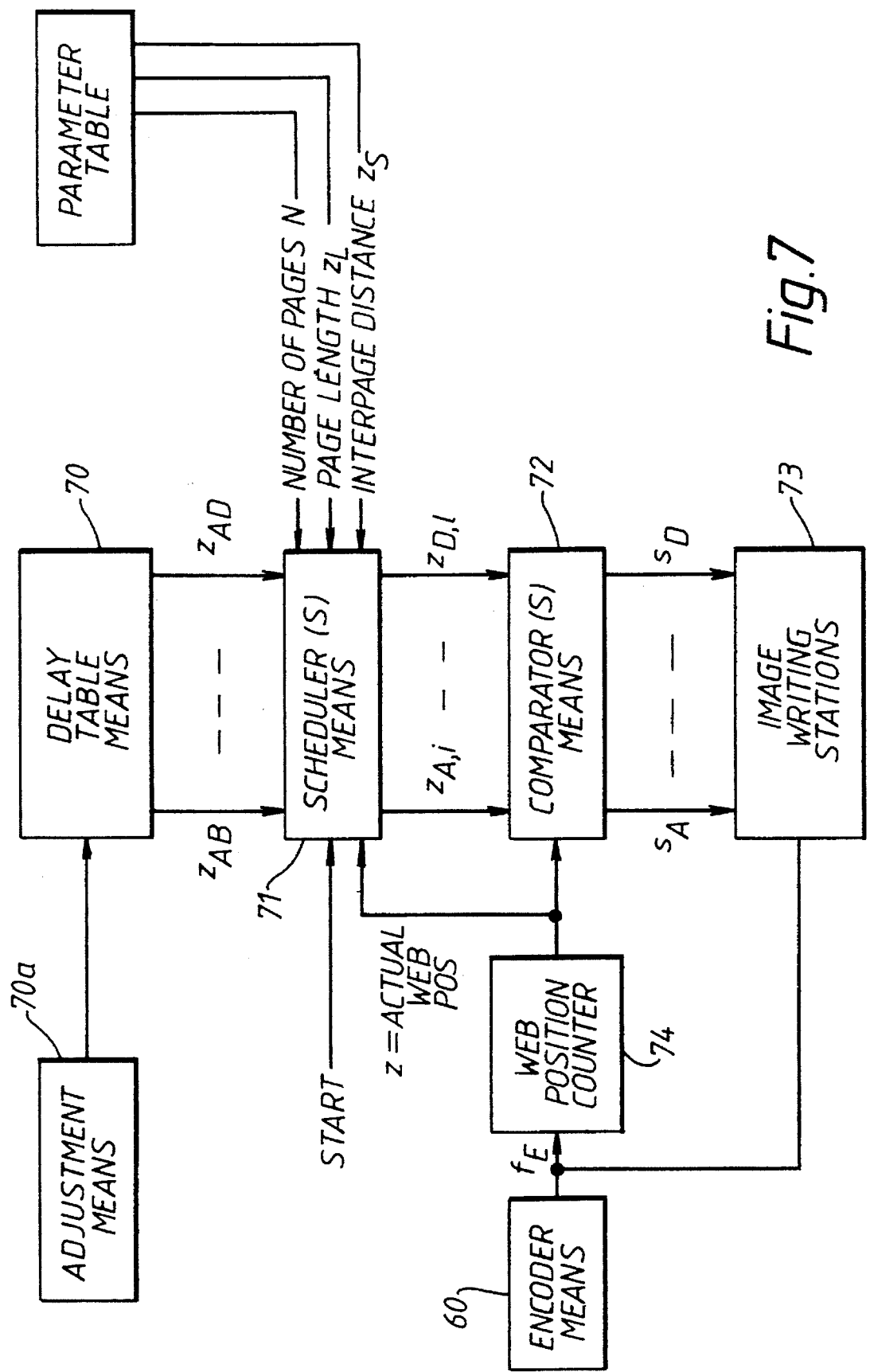
FIG. 7 shows a schematic arrangement of register control means for controlling the registration of images in a printer according to the invention.

Referring to FIG. 7, encoder means 60 generates a signal with frequency $f_E$ being n times higher than the frequency $f_D$ resulting from encoding the time it takes for the web 12 to advance over a distance equal to the line distance d. For a 600 dpi printer (line distance d=42.3 μm), a web speed of 122.5 mm/s results in a frequency $f_D$=2896 HZ.

A web position counter 74 counts pulses derived from the encoder 60 so that at any time, the output of the counter is indicative of a relative web position z, wherein each increment of z denotes a basic web displacement ρ being 1/nth of the line distance d.

In order to calibrate the register means, the operator makes a test print, the print is examined and any misregistration error Δ is measured. A pulse number correction, equal to Δ/ρ is then added or subtracted from the values $z_{AB}$ etc. stored in the delay table 70 by the adjustment means 70a, using methods well known in the art.

Delay table means 70 stores the predetermined values $Z_{AB}$, $Z_{AC}$, $Z_{AD}$ equalling the number of basic web displacements to be counted from the start of writing a first image on drum 24a, at point A1, to the moment the writing of subsequent images on drums 24b, 24c and 24d; at points B1, C1 and D1, so that the position of all subsequent images on the paper web 12 will correspond exactly to the position of the first image.

Scheduler means 71 calculates the values $Z_{A,i}$, $Z_{B,j}$, $Z_{c,k}$ and $Z_{D,1}$; wherein each of these values represent the relative web position at which the writing of the ith, jth, kth and lth image should be started at image writing stations A, B, C and D. Given that values:

N=the number of images to print;

$z_L$=the length of an image expressed as a multiple of basic web displacements; and $z_s$=the space to be provided between two images on paper (also expressed as a multiple of basic web displacements, The scheduler means can calculate the different values of $z_{A,i} \ldots Z_{D,1}$ as follows.

When the START signal (the signal which starts the printing cycle) is asserted, then (assuming the first image is to be started at position $z_0 + z_1$, wherein $z_0$ represents the web position at the moment the START signal is asserted):

TABLE 1

| | | | |
|---|---|---|---|
| $z_{A,0} = z_0 + z_1$ | $z_{B,0} = z_0 = z_{AB} + z_1$ | ... | $z_{D,0} = z_0 + z_{AD} + z_1$ |
| $z_{A,1} = z_0 + z_L + z_S + z_1$ | $z_{B,1} = z_{A,1} + z_{AB} + z_1$ | ... | $z_{D,1} = z_{A,1} + z_{AD} + z_1$ |
| | $= z_0 + z_L + z_S + z_{AB} + z_1$ | ... | $= z_0 + z_L + z_S + z_{AD} + z_1$ |
| . | . | | . |
| . | . | | . |
| . | . | | . |
| $z_{A,i} = z_0 + i(z_L + z_S) + z_1$ | $z_{B,j} = z_0 + z_{AB} + j(z_L + z_S) + z_1$ | ... | $z_{D,1} = z_0 + z_{AD} + 1(z_L + z_S) + z_1$ |

With good phase tracking performance, the phase difference between $\Theta_s$ and $\Theta_m$ approaches zero, so that due to the frequency multiplication, there are m times more phase edges on $f_E$ than between two encoder sensor input phase Comparator means 72 continuously compares the values $z_{A,i} \ldots Z_{D,1}$, wherein i,j,k and l start at 0 and stop at N−1, with the value z and, when match(es) are encountered generates signal(s) $s_A$ to $s_D$ after which the respective value(s) i to 1 are incremented.

Image writing stations 73, upon receipt of the trigger signal(s) $s_A$ to $s_D$, start the writing of the image at image writing station(s) A to D. Once the writing of an image has started, the rest of the image is written with a line frequency $f_D$ derived from $$f_D = f_E/n,$$

the frequency $f_D$ thus being in synchronism with the encoder output, the phase of which is zeroed at the receipt of the trigger signal.

The above described mechanism is of course not restricted to control only the registration of the different images on the paper, but can also be used for generating accurate web-position aware signals for any module in the printer. Examples of such modules are the cutter station 20, the stacker 52, etc (see FIG. 2).

Figure 8A:
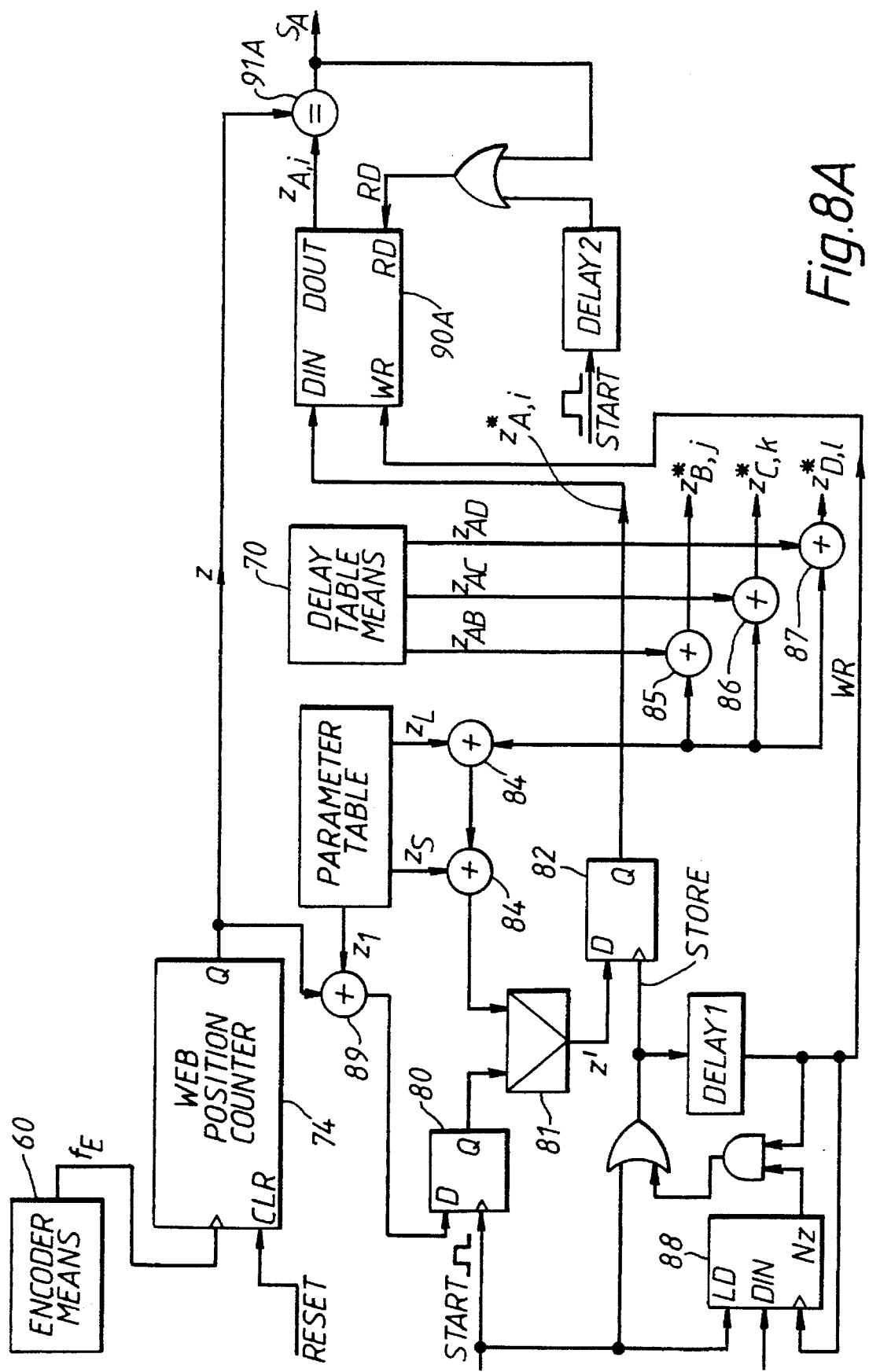
FIG. 8A more particularly shows the offset table, scheduler, encoder and web position counter.
Figure 8B:
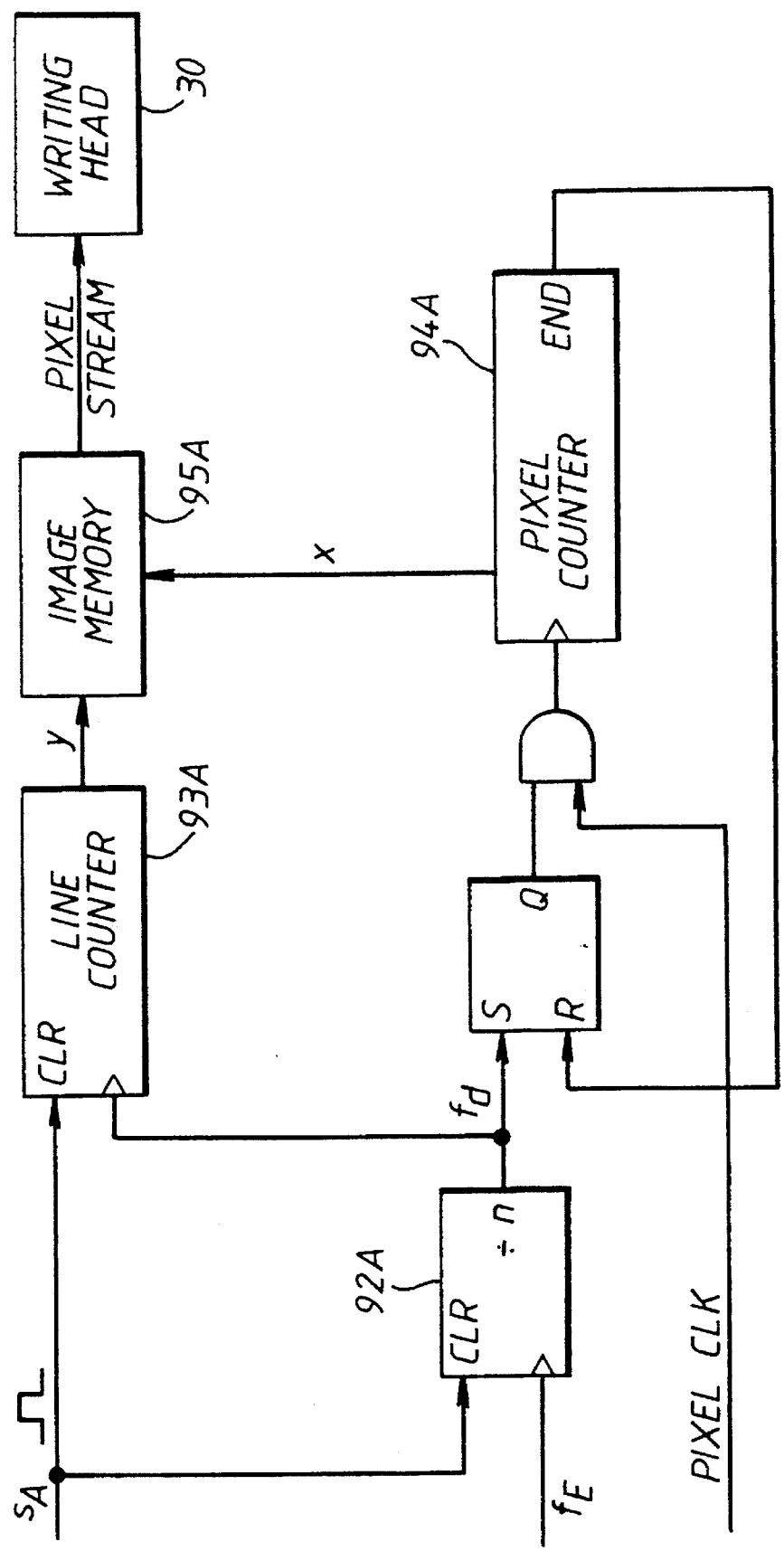
FIG. 8B shows the comparator and image transfer station A.

Referring to FIGS. 8A and 8B, when the START pulse initiating the printing cycle is asserted, register 80 stores the sum $z_0 + z_1$, as calculated by means of adder 89. Multiplexer 81 feeds this value through to register 82. Adders 85, 86 and 87 then calculate $z^*_{B,j}$, $z^*_{C,k}$ and $z^*_{D,1}$, with j, k and l being zero, being the scheduled web positions at which writing of the first image on the respective image transfer station should start, $z^*_{A,i}$, with i being zero, of course being equal to $z_0 + z_1$. After a period of time equal to delay 1, these values are stored in the FIFO (first-in, first-out) memories 90A, 90B, 90C, 90D, of which for simplicity only FIFO 90A is shown. Meanwhile, adders 83 and 84 have calculated $z^*_{A,1}$ being $z^*_{A,0} + z_L + z_s$, and this value is fed through multiplexer 81 to register 82. Again, adders 85, 86 and 87 will then calculate from $z^*_{A,1}$ the values $z^*_{B,1}$, $z^*_{C,1}$ and $z^*_{D,1}$ which are again stored in the FIFO's 90A etc. This process continues until down-counter 88, which started at the value N and decrements with every write pulse storing a next series of values $z^*_{A,i}$ to $z^*_{D,1}$ into the FIFO's, reaches zero. When this has happened, all positions at which writing of an image should start are calculated and stored, in chronological order, in the FIFO memories.

Meanwhile, comparators 91A etc. are continuously comparing the web position z to the values $z_{A,i}$ to $Z_{D,1}$, where i to l are initially zero, as read from the FIFO's. When z equals $z_{A,0}$, the signal $s_A$ is asserted, which resets divider 92A (see FIG. 8B), thus synchronising the phase of the $f_D$ signal with the $s_A$ pulse for reasons of increased sub-line registration accuracy as explained above. Also line counter 93A is cleared which addresses line y=0 in the image memory 95A. For every pulse of the $f_D$ signal, pixel counter 94A produces an up-counting series of pixel addresses x. As the image memory is organised as a two-dimensional array of pixels, the counting pixel address x, at the rate specified by the signal PIXEL-CLK, produces a stream of pixel values which are fed to the writing heads 30 resulting in a line-wise exposure of the photoconductive drum surface 26. For every n pulses of the $f_E$ signal, a next line of pixels is fed to the writing heads. In this way the registration of the different images is not only accurate at the beginning of the image, but it also stays accurate within the image.

As soon as the writing of an image has started, the $s_A$ to $s_D$ signals will cause the next $z_{A,i}$ to $Z_{D,1}$ value to be read from the FIFO memory 90A etc. so that the next copy of the image will be started as scheduled.

Figure 9:
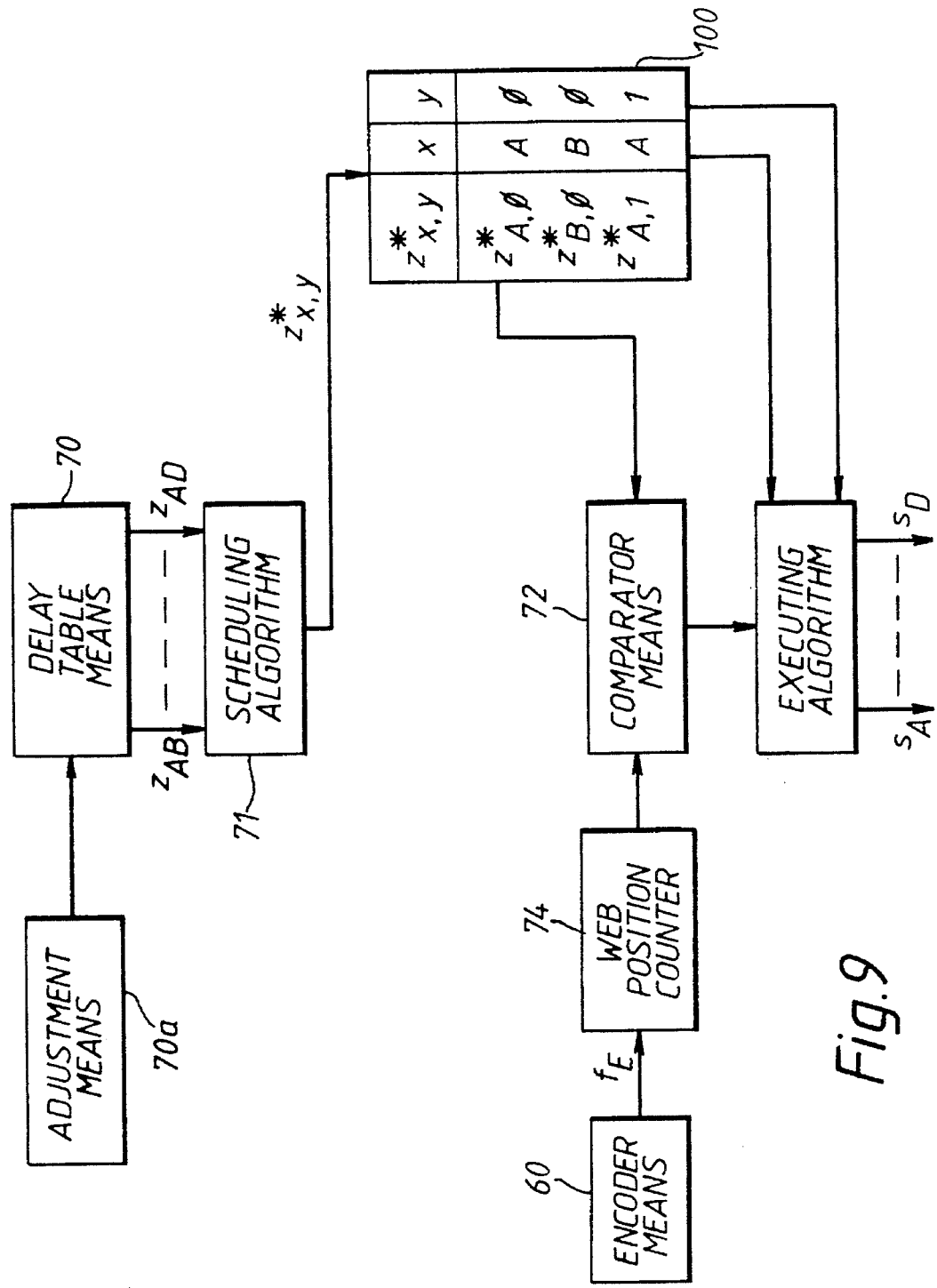
FIG. 9 shows an alternative embodiment of a control circuit for controlling the registration of images in a printer according to the invention.

In the more preferred embodiment of the invention shown in FIG. 9, substantial parts of the control circuit are implemented by means of a software program being executed on a microprocessor chip. In this case, all functions offered by the electronic circuit of FIG. 8A, except for the encoder, are replaced by a software code, thereby increasing the flexibility of the control circuit.

The calculated values $z^*_{A,i}$ to $z^*_{D,1}$ are preferably stored in one or more sorted tables 100 in the microprocessor's memory. As in the hardware solution, a comparator means 72 continuously compares the first entry in this list with the web position z as given by a web position counter, which is preferably software but possibly hardware assisted. Upon detection of a match between the two values, the microprocessor asserts the respective signal $s_A$ to $s_D$.

Figure 10:
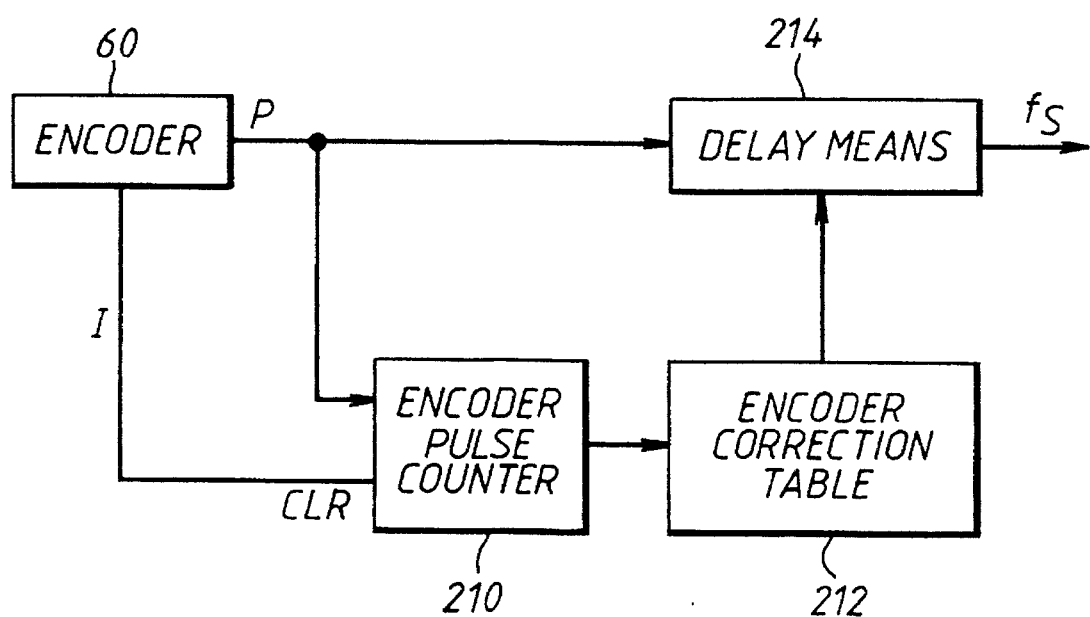
FIG. 10 shows a schematic arrangement of a preferred embodiment of the encoder correction means.

Referring to FIG. 10, in order to correct the period of each individual pulse output from the encoder sensor means, the encoder sensor means produces an additional signal I which acts as an index for the encoder signal P. When the encoder means comprises a disc with a plurality of spaced markings, which are sensed by a first optical sensor, thereby producing pulses that are indicative of web displacement, the signal I is generated by means of a second optical sensor, so that for every revolution of the encoder disc, a single pulse is generated. As such the encoder pulse counter 210 identifies, using the index pulse as a reference, by means of a multi-bit signal, each pulse P produced by the first optical sensor. In the encoder correction table 212, which is preferably contained in some form of non-volatile memory such as a programmable read-only memory (PROM), are stored predetermined multi-bit period time correction values for each of the individual encoder pulses P. In order to allow the encoder correction means to decrease the period time of a certain pulse, such period time correction values are the sum of a positive fixed time and a positive or negative corrective time. Delay means 214 will delay every pulse output from the first encoder sensor by a time equal to the predetermined correction time received from the encoder correction table 212 thus producing a corrected encoder signal $f_s$.

We claim:

1. An electrostatographic printing process for forming at least one colorless toner image in combination with at least one color toner image produced in an electrostatographic way on a receptor element, whereon said toner images are fixed, wherein the information for producing at least one electrostatic latent image corresponding with said colorless toner image derives from a digital electrical signal representing (i) the spatial boundaries of said colorless toner image and (ii) the amount of deposited colorless toner per pixel, and wherein said process comprises the step of conveying said receptor element past a plurality of toner-image producing electrostatographic stations, wherein at each image-producing station the following operations are carried out:

forming each electrostatic latent image on a rotatable endless surface means;

depositing toner on said electrostatic latent image to form a toner image on said rotatable surface means; and transferring each toner image from its corresponding rotatable surface means onto said receptor element, wherein the at least one colorless toner image produced on the receptor element is formed at a resolution coarser than the at least one color toner image.

2. A process according to claim 1, wherein the information for producing at least one electrostatic latent image corresponding with said colorless toner image derives from a separate set of electrical signals.

3. A process according to claim 1, wherein said colorless toner image is formed in substantial congruency with at least one color toner image.

4. A process according to claim 1, wherein:

(a) the areas of said receptor element that will be covered subsequently with said color toner image are coated first with colorless toner transferred onto said receptor element from said rotatable endless surface means, and/or (b) after said receptor element has been covered with at least one color toner image the corresponding areas thereof are coated with colorless toner transferred onto said receptor element from said rotatable endless surface means.

5. A process according to claim 1, wherein said colorless toner is deposited uniformly over the whole image frame of colored toner image.

6. A process according to claim 1, wherein the amount of deposited colorless toner per pixel is such that the total amount of toner deposited per pixel is substantially uniform.

7. A process according to claim 1, wherein said colorless toner after fixing exhibits a glossy surface aspect.

8. A process according to claim 1, wherein said colorless toner after fixing exhibits a matte surface aspect.

9. A process according to claim 1, wherein said colorless toner provides ultraviolet radiation absorbtion.

10. A process according to claim 1, wherein said colorless toner provides on said receptor element an adhesive layer for color toner image transferred and fixed thereon.

11. A process according to claim 1, wherein said colorless toner provides on top of said transferred color toner image a coating that improves the resistance against abrasion of said color toner image.

12. A process according to claim 1, wherein colorless toner containing an optical brightening agent is deposited on said receptor element in areas not covered by color toner thereby improving the whiteness of said areas.

13. A process according to claim 1, wherein said receptor element is in the form selected from a sheet and a web.

14. A process according to claim 13, wherein said images are fixed after the transfer of the last toner image to said receptor element.

15. A printing apparatus for forming at least one colorless toner image in combination with at least one color toner image on a receptor element whereon the toner images are fixed, wherein said apparatus comprises means for producing at least one electrostatic latent image corresponding with said colorless toner image which means operates with a digital electrical signal representing (i) the spatial boundaries of said colorless toner image(s) and (ii) the amount of deposited colorless toner per pixel, and wherein said apparatus comprises means for conveying said receptor element past a plurality of toner image-producing electrostatographic stations, and in each image-producing station there are:

means for forming an electrostatic latent image on a rotatable endless surface means;

means for depositing toner on said electrostatic latent image to form a toner image on said rotatable surface means, and means for transferring each toner image from its corresponding rotatable surface means onto said receptor element, wherein said means for producing the at least one electrostatic latent image corresponding with said colorless toner image is capable of forming the at least one colorless toner image at a resolution coarser than the at least one color toner image.

16. A printer according to claim 15, wherein said means for forming an electrostatic latent image is a photoconductive recording member.

17. A printer according to claim 15, wherein the first of said image-producing stations is for applying colorless toner onto said receptor element.

18. A printer according to claim 15, wherein the last of said image-producing stations is for applying colorless toner onto said receptor element.

19. A printer according to claim 15, wherein an image fixing station is present downstream of said image-producing stations.

* * * * *

UNITED STATES PATENT AND TRADEMARK OFFICE
CERTIFICATE OF CORRECTION

PATENT NO. : 5,506,671
DATED : April 9, 1996
INVENTOR(S) : Buts et al.

It is certified that error appears in the above-indentified patent and that said Letters Patent is hereby corrected as shown below:

Column 12, line 47, that portion of the equation reading "$^1AB'$" should read --$^{1'}AB$--;

Column 13, line 5, "ect." should read --etc.--;

Column 13, line 49, "$\theta_3$" should read --$\theta_s$--;

Column 14, line 15, "HZ" should read --Hz--.

Signed and Sealed this

Third Day of September, 1996

BRUCE LEHMAN

Attest:

Attesting Officer

Commissioner of Patents and Trademarks